March 29, 1966 R. KAUFFMANN 3,242,896
PARACHUTABLE VEHICLE
Filed Oct. 28, 1964 3 Sheets-Sheet 2

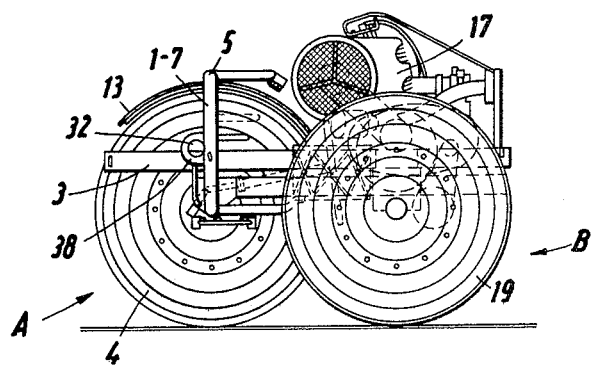
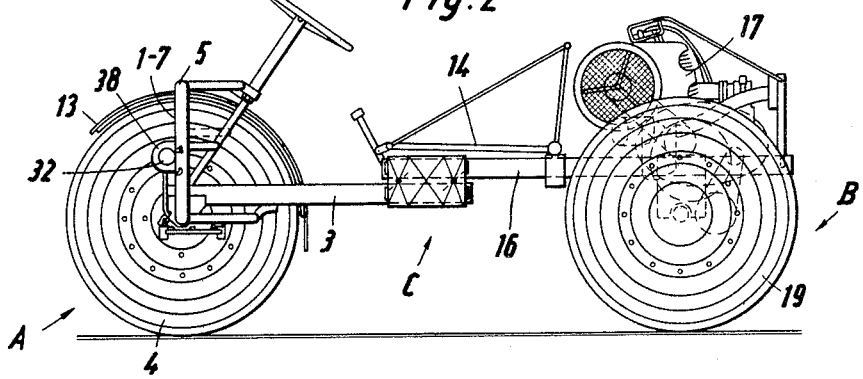
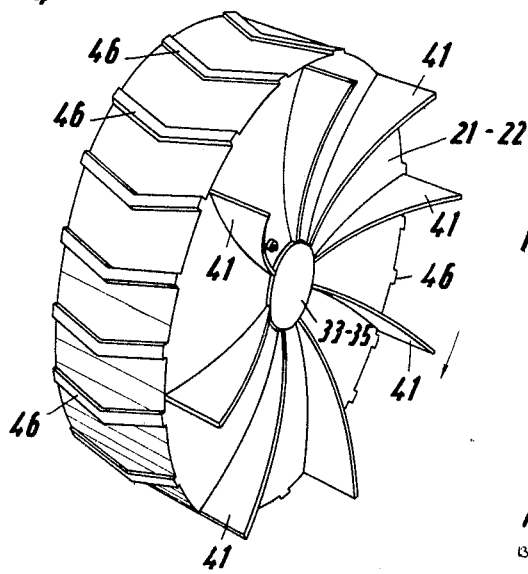

Inventor:
R. Kauffmann
by
Richards & Geier
ATTORNEYS

March 29, 1966  R. KAUFFMANN  3,242,896
PARACHUTABLE VEHICLE
Filed Oct. 28 1964  3 Sheets-Sheet 3
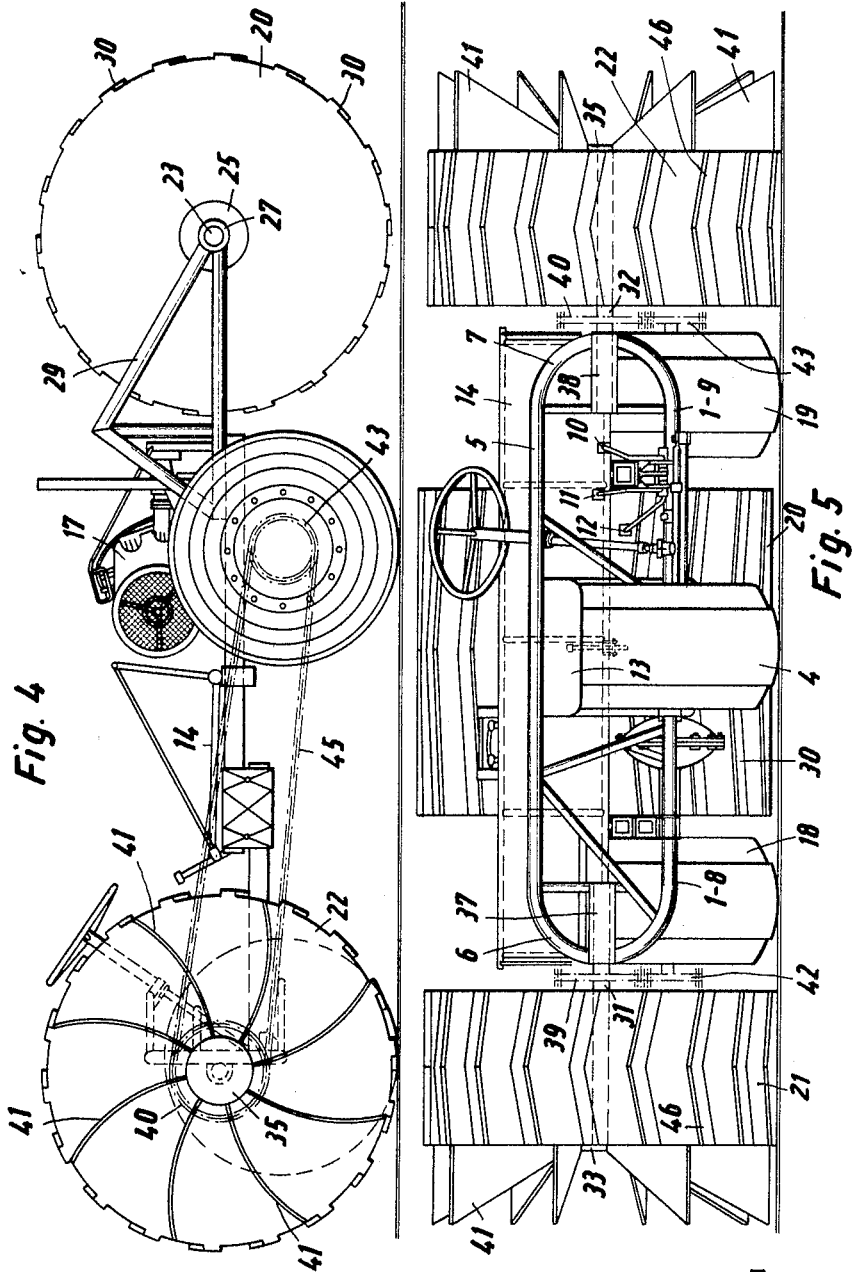
Inventor:
R. Kauffmann
By
Richards Geier
ATTORNEYS

United States Patent Office 3,242,896
Patented Mar. 29, 1966

3,242,896
PARACHUTABLE VEHICLE
Raymond Kauffmann, Oupeye, Belgium, assignor to Fabrique Nationale d'Armes de Guerre, Société Anonyme, Herstal-lez-Liege, Belgium
Filed Oct. 28, 1964, Ser. No. 407,008
Claims priority, application Belgium, Nov. 7, 1963, 43,128, Patent 639,641
3 Claims. (Cl. 115—1)

This invention relates to a light vehicle of reduced bulk and parachutable construction. This vehicle is of a kind stripped to bare essentials, comprising in combination: a front wheel and a rear axle assembly with two driving wheels, said front wheel being carried by a tubular frame extending practically over the whole width of the rear axle assembly, said frame also carrying steering and control devices for the vehicle; a chassis joining said tubular frame and said rear axle assembly, said chassis comprising telescope stringers and locking means for the latter, respectively in road travelling and parachuting positions; an engine and transmission devices to drive said rear wheels; in front of said engine, a single seat extending over the whole width of the rear axle assembly and thus conditioned to allow four passengers to sit side by side; and removable means rendering the vehicle amphibian.

It is an object of the invention to realize such vehicle with the view of obtaining exceptionally high performances. These performances refer equally to the importance of the useful load with respect to the dead weight of the vehicle and to the mobility of the vehicle on any ground, to the maximum protection of the materials and the occupants as well as to a considerably wider range of useful applications of the vehicle, particularly for military purposes.

To fulfill this purpose, such vehicles have been provided according to the invention with means enabling the conveyance of four occupants seated at the front side. This surprising result is obtained by the fact that the useful width, i.e. the width of the single seat, is made practically equal to the width measured at the outside of the rear axle assembly of the vehicle, the end parts of this single seat being overhung with respect to the two-part side stringers of the chassis.

In conjunction with such useful width of the single seat, a front axle assembly has been built under the shape of a tubular structure combined with the steering members of the vehicle in such manner that the latter become very simple and are well protected, while the steering wheel and the steering rod may readily slide in each other.

This tubular structure is combined with an original support for the rolling elements respectively the steering members of the single front wheel, thereby providing simultaneously a very simple construction and maximum safety conditions.

A vehicle according to the present invention has the surprising feature of being able to carry either four occupants at the front seat or a smaller number thereof, the missing number being then replaced by stowing different materials, such as luggage, weapons, ammunition, stretchers or the like, the vehicle being especially designed and constructed to enable the attachment and the conveyance of the occupants and/or the said load at a relatively high speed, having regard to the purpose of this vehicle and without impairing the properties of this vehicle appropriated for any ground texture.

These vehicles being particularly intended for military purposes, it has been found desirable for tactical reasons to make these vehicles amphibian by adjoining a temporary device thereto, so that they may step across a water stretch like a river, a lagoon and even a sea arm.

It is an object of the invention to provide such an amphibian device having, in the collapsed state, a relatively restricted bulk and being provided either to be parachuted separately from the vehicle or mounted thereon, this device being otherwise readily and very rapidly mounted.

It is another object of the invention to provide such amphibian vehicle capable of independently going into and out of water and having therein a sufficient speed to overcome streams of about 5 knots.

It is another object of the invention to provide the said vehicle with a sufficient supporting area so that it may be used under full load in boggy grounds.

Finally, it is another object of the invention to give a high stability in water to the vehicle, even under full load, to prevent substantially any upsetting.

The invention will be now more fuly described with reference to the enclosed drawings representing a preferred embodiment of the vehicle of the invention as well as the essential elements thereof.

FIGURE 1 shows a vertical section of a parachutable vehicle according to the main patent, in the telescoped state;

FIGURE 2 shows the vehicle of FIGURE 1 ready for use;

FIGURE 4 is a side view of the vehicle shown in FIGURE 3;

FIGURE 5 is a front view of the vehicle shown in FIGURE 3;

FIGURE 6 is a perspective view of a floater such as mounted on the right and at the front side of the vehicle shown in FIGURE 3.

Figure 3:
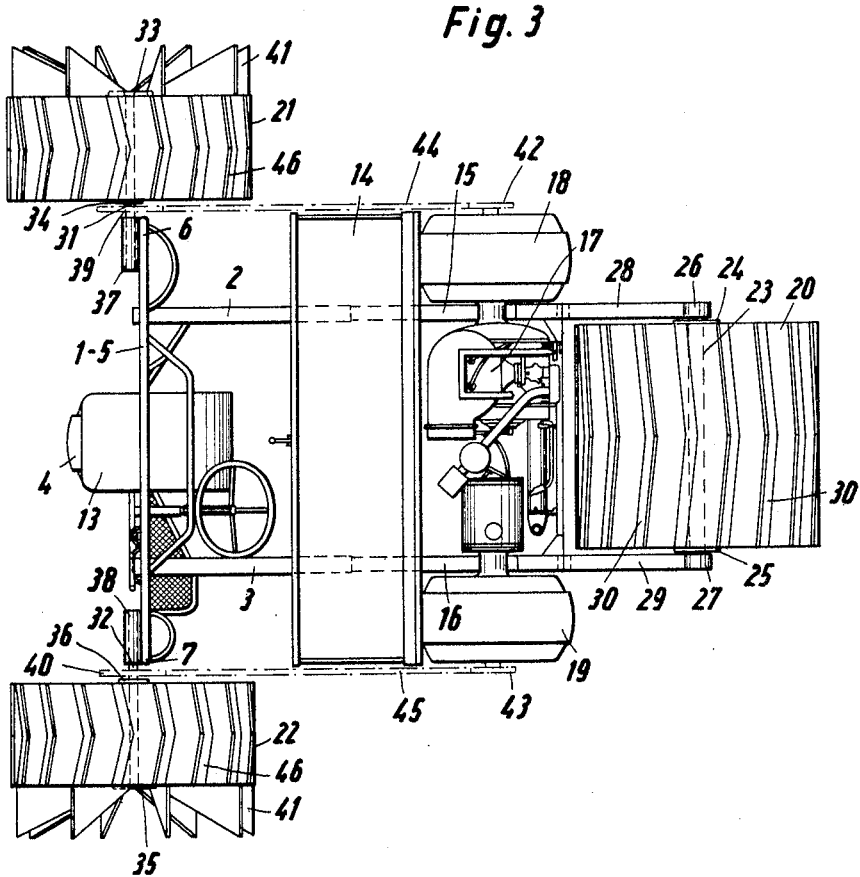
FIGURE 3 is a plane view of the vehicle shown in FIGURE 2, the latter being equipped with an amphibian device.

In the illustrated embodiment, the vehicle consists essentially of a front axle assembly A, a rear axle assembly B and locking elements C, which may connect firmly the assemblies A and B either in the road travelling position (FIGURE 2) or in the transporting and/or parachuting position (FIGURE 1).

The front axle assembly A consists of a tubular frame 1, two spar sections 2, 3 for the stringers and a single wheel 4. The length L of this tubular frame 1 is equal or approximately equal to the overall width L' of the rear axle assembly.

The said tubular structure is essentially characterized by the rectilinear and horizontal position of the upper part 5 and the connection of this rectilinear part by means of semi-circular ends 6, 7 with the rectilinear lower spar sections 8, 9 of unequal length.

This tubular frame likewise carries the accelerator, clutch and brake pedals, 12, 10 and 11 respectively.

The front axle assembly of the vehicle is completed by a shield 13 acting as a mud guard and shaped so as to cover the single front wheel through an angle of approximately 120° to protect very effectively the occupants against projected mud and other foreign bodies.

The rear axle assembly B of the vehicle essentially consists of a single seat 14 for four occupants seated at the front side, in conjunction with the spar sections of the stringers 15–16 forming part of the chassis, whereas the assembly B consists also of a power unit 17, the wheels 18–19 with their supports and all the accessory parts necessary to these essential elements.

In this embodiment, the amphibian device according to the invention comprises a rear floater 20 and two front floaters 21 and 22 respectively. The said rear floater 20 has a generally cylindrical shape and it is traversed by an axis 23 made integral with the side faces of the said floater 20 through the disks 24–25 and supported on both sides by journals 26 and 27 respectively. These journals 26 and 27 are each disposed at the ends of triangular frames 28, 29, the said frames 28, 29 being interlocked with the side sills 15, 16 respectively of the vehicle chassis. The floater 20, which may rotate freely about the said axis 23, has on its cylindrical face, cross ribs 30 providing the rigidity and the solidity of the floater 20. The front floaters 21–22 are each mounted on an axis 31 and 32 respectively by means of disks 33–34 and 35–36 respectively, the said axes 31–32 being housed at their free ends in axis bearings 37 and 38 respectively, integral with the said front frame 1. Each of the said axes 31 and 32 is provided, between its free end and the inner face of the corresponding floater, with a pinion 39 and 40 respectively, keyed upon the said axes, whereas the floaters 21 and 22 are provided, on their outer side face, with blades 41. These blades 41, providing namely for the rigidity of the said floaters 21–22 may be either inserted or moulded simultaneously with the said floaters. Pinions 42 and 43, respectively coplanar with the said pinions 39 and 40, are each mounted on a rear driving wheel of the vehicle and connected by means of chains 44 and 45 respectively to the said pinions 42–43. Thus, the propelling of the vehicle on the ground, before going into water or when going out the same or on a boggy ground is effected as well through the usual rear driving wheels as through the front floaters 21–22. For this purpose, the latter are provided on their rolling faces, with ribs 46 contributing also to the rigidity of the said floaters.

In water, the propelling is provided by the said blades 41 and the steering is effected by braking one of the floaters 21–22. Since the latter are driven via the chains 42–43 through the pinions 42, 43 situated on the outlet side of the vehicle differential, the braking or the locking-up of one of the said floaters imparts a twice more rapid rotation to the other floater, thereby giving a very great handiness to the vehicle.

It is apparent that numerous modifications may be brought to the above described amphibian device within the scope of the invention.

For instance, the rear floater may be constructed by adjoining two floaters identical to the front floaters, thereby saving a special mould for the said rear floater.

In another embodiment, the triangular frames supporting the axis of the rear floater may swing on the vehicle chassis, returned downwardly by resilient means and provided with a device for locking-up in one or several desired positions.

The said braking of any front floater may be effected manually by the seaters of the vehicle or by braking any of the rear wheels. In that case, the single braking pedal is advantageously replaced by two pedals disposed side by side and actuating each the braking of a rear wheel.

The shape and the number of the blades may be modified and adapted to the needs, while the floaters may be inflated either by compressed air or $CO_2$ cartridges or by the motor exhaust itself.

As previously said, the floaters in collapsed position may be either parachuted separately from the vehicle or housed on board thereof.

The floaters may be made of any suitable material and their ribs and/or blades may be either moulded simultaneously with the said floaters and in the same material as the latter, or they may be made of a material incorporated during the moulding operation or inserted to the moulded floaters.

These several features have allowed the construction of a vehicle stripped to the bare essentials, having a light weight and being of small bulk in its road travelling position, while being still less bulky in its transporting and/or parachuting position. This vehicle is capable of exceptional performances, not only due to the fact that it allows the simultaneous conveyance of four occupants seated at the front side, but also to the presence in the same vehicle of four occupants, who may thus perform a great variety of missions. On the other hand, the presence of these four occupants makes the said vehicle utilizable in the most various conditions and on grounds excluding the possibility of using any other vehicle. As an example, it may be said that these four occupants may bring the vehicle practically over any obstacle either by using the power unit or by drawing the said vehicle by means of a cable or a rope, all these possibilities being allowed precisely by the presence of the four occupants.

Of course, the various elements described above may be substituted by any other equivalent elements or members having the same function, without thereby departing from the scope of the invention. In addition, it is also possible to use, if desired, any kind of auxiliary means. The invention covers any vehicle of the kind described, designed to make use of the useful width which is substantially equal to the overall width of the rear part of the vehicle, so that four occupants may seat, while facing forwards.

What I claim is:

1. A parachutable vehicle, comprising in combination: a front wheel, a rear axle assembly, two driving wheels carried by said rear axle assembly, a tubular frame carrying said front wheel and extending practically over the whole width of the rear axle assembly, steering and control devices for the vehicle carried by said frame; a chassis joining said tubular frame and said rear axle assembly, said chassis comprising telescopic stringers and locking means for the latter, respectively in road travelling and parachuting positions; an engine and transmission devices to drive said rear wheels; in front of said engine, a single seat carried by said chassis and extending over the whole width of the rear axle assembly and thus conditioned to allow four passengers to sit side by side; and removable means rendering the vehicle amphibian, comprising at least two front floaters, axles carrying said floaters, pinions carried by said axles, brackets connected with said tubular frame, said axles being housed, when mounting said floaters on the vehicle, in said brackets, other pinions upon the outer face of the rear driving wheels of the vehicle, a chain interconnecting said pinions, another frame integral with the vehicle chassis, an axle carried by said other frame, and a rear floater carried by the last-mentioned axle.

2. A parachutable vehicle, comprising in combination: a front wheel, a rear axle assembly, two driving wheels carried by said rear axle assembly, a tubular frame carrying said front wheel and extending practically over the whole width of the rear axle assembly, steering and control devices for the vehicle carried by said frame; a chassis joining said tubular frame and said rear axle assembly, said chassis comprising telescopic stringers and locking means for the latter, respectively in road travelling and parachuting positions; an engine and transmission devices to drive said rear wheels; in front of said engine, a single seat carried by said chassis and extending over the whole width of the rear axle assembly and thus conditioned to allow four passengers to sit side by side; and removable means rendering the vehicle amphibian, comprising at least two front floaters, axles carrying said floaters, pinions carried by said axles, brackets connected with said tubular frame, said axles being housed, when mounting said floaters on the vehicle, in said brackets, other pinions upon the outer face of the rear driving wheels of the vehicle, a chain interconnecting said pinions, a rear floater consisting of two floaters identical with said front floaters, and means connected with said chassis and supporting said rear floater.

3. A parachutable vehicle, comprising, in combination: a front wheel, a rear axle assembly, two driving wheels carried by said rear axle assembly, a tubular frame carrying said front wheel and extending practically over the whole width of the rear axle assembly, steering and control devices for the vehicle carried by said frame; a chassis joining said tubular frame and said rear axle assembly, said chassis comprising telescopic stringers and locking means for the latter, respectively in road travelling and parachuting positions; an engine and transmission devices to drive said rear wheels; in front of said engine, a single seat carried by said chassis and extending over the whole width of the rear axle assembly and thus conditioned to allow four passengers to sit side by side; and removable means rendering the vehicle amphibian, comprising at least two front floaters, axles carrying said floaters, pinions carried by said axles, brackets connected with said tubular frame, said axles being housed, when mounting said floaters on the vehicle, in said brackets, other pinions upon the outer face of the rear driving wheels of the vehicle, a chain interconnecting said pinions, another frame integral with said chassis, an axle carried by said other frame, a rear floater carried by the last-mentioned axle, brakes mounted on the axles of the rear wheels of the vehicle, whereby the steering of the vehicle on water is provided by braking one or the other of said front floaters by said brakes, and two adjoining pedals for an individual actuation of each of said brakes.

References Cited by the Examiner

UNITED STATES PATENTS

| 2,503,111 | 4/1950 | Higgins | 115—1 |
| 2,979,016 | 4/1961 | Rossi | 115—1 |
| 3,004,619 | 10/1961 | Straussler | 180—27 |

FOREIGN PATENTS 1,316,369   12/1962   France.

MILTON BUCHLER, *Primary Examiner.*

ANDREW H. FARRELL, *Examiner.*